Patented Nov. 23, 1943

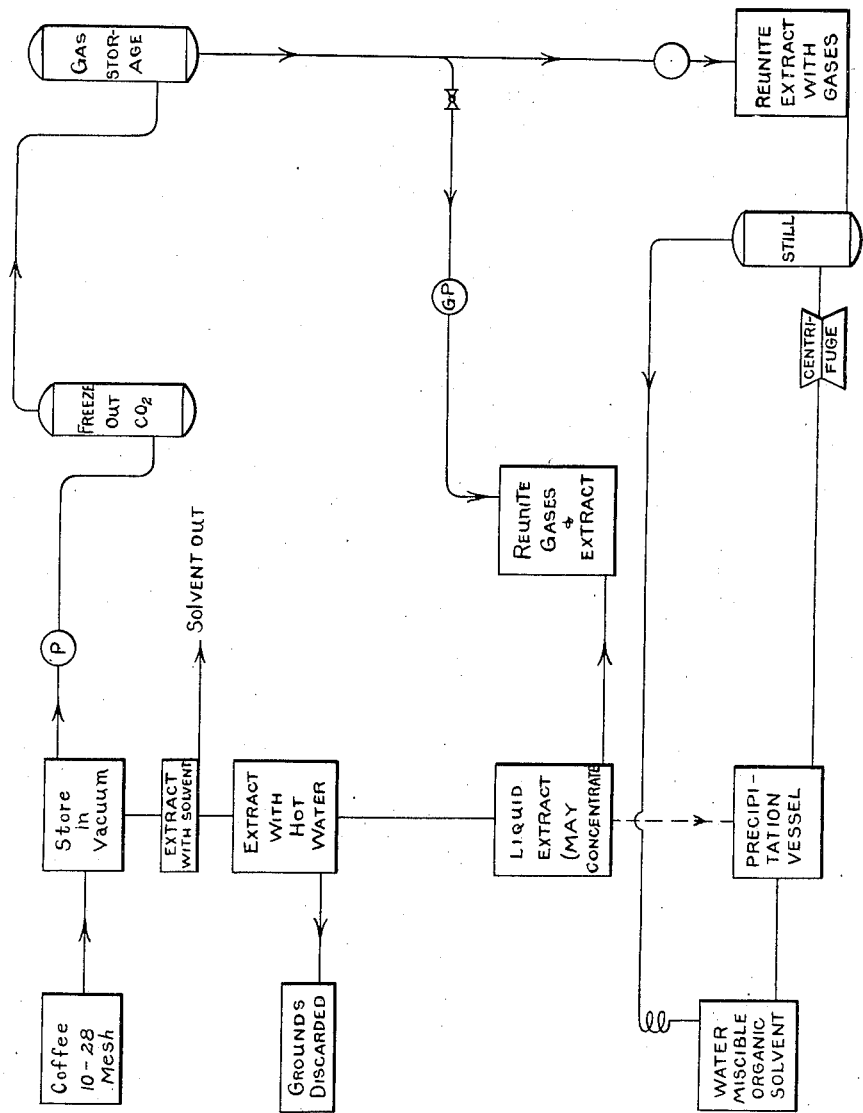

2,335,206

UNITED STATES PATENT OFFICE 2,335,206

COFFEE EXTRACT

Elton R. Darling, Rockford, Ill., assignor to Hills Bros. Coffee Inc., San Francisco, Calif., a corporation of California Application May 10, 1940, Serial No. 334,303

11 Claims. (Cl. 99—71)

The present invention relates to a number of improvements in the manufacture of palatable coffee extracts in liquid form.

One of the principal objects of the invention is to produce a coffee extract from which certain undesirable constituents have been eliminated, particularly those which tend to produce a precipitate in the extract upon storage. It also includes the reintroduction into the coffee extract of certain portions of the volatile gases which are liberated from freshly roasted coffee so as to reintroduce into the extract those volatile substances which are particularly noticeable by the sense of smell when drinking a hot cup of coffee.

One of the objects of the invention includes the treatment of the gases removed from freshly roasted coffee by cooling them, either at atmospheric or higher pressure, to such an extent as to freeze out of them the therein-contained carbon dioxide in the form of snow.

A further object of the invention includes the preliminary extraction of the degassed ground coffee for the removal therefrom of waxes and oils prior to the extraction of the ground coffee with hot water.

A further object of the invention is the treatment of the ground coffee extract with a water-miscible organic solvent for the purpose of precipitating from the extract a gummy or resinous material, which, if left in the coffee extract, would lead to cloudiness or possibly the formation of a precipitate therein in storage.

Other objects of the invention will become apparent from the further description herein when taken in connection with the single sheet of drawing, which latter is a diagrammatic flow sheet of the various operations involved in the preparation of the coffee extracts of the present invention.

A fundamental principle involved in the present invention is the release of gases from the freshly roasted coffee, the separation of these gases and the desired aromatic volatile constituents or gases from the undesired carbon dioxide, the extraction of the degasified coffee with a volatile solvent to remove wax or oils (this may be omitted if desired), the extraction of the ground coffee with hot water to produce a liquid extract which may be concentrated by evaporation to any desired concentration, and the reuniting of the volatile aromatic principles with this extract. As an alternative, and to effect a still further improvement, the liquid extract, either before or after concentration, may be mixed with a certain quantity of a water-miscible organic solvent, such as methyl alcohol, ethyl alcohol, propyl alcohol, acetone, ether and the like to precipitate certain gummy materials followed by the separation of the said solids and the distillation of the organic solvents from the coffee extract. This distillation may be coupled with or may occur concurrently with the concentration of the extract. The invention, of course, includes the recovery of the volatile solvent for reuse. The final extract, in either event, is reunited with the separated aromatic constituents to produce the finished product of the present invention.

The entire process can best be followed in connection with the drawing.

For example a suitable coffee, preferably of a blend which does not require a high roast, is roasted according to the modern approved methods, which in themselves form no part of the present invention, and is then ground to a fineness of between 10 and 28 mesh. The ground coffee is thereupon transferred into a storage tank in which a vacuum is produced, whereupon the container is sealed in order to permit the gradual escape of the gases contained in the coffee into the evacuated space, of course thereby causing a rise in pressure therein from vacuum up to atmospheric. It is preferable during the gradual liberation of these gases in the evacuating chamber slowly to stir or turn over the coffee so that all portions thereof may be equally affected by the vacuum. This agitation may be accomplished either by means of stirrers or by the expedient of rotating the vacuum container. After a period of from 24 to 48 hours, at which time most of the gases will have been liberated, as may be ascertained by a reading of the gauge connected with the apparatus and shown by the fact that the pressure no longer varies, the vacuum pump indicated by the letter P on the drawing is again operated, pumping the liberated aromatic principles and gases out of the container and pumping them preferably under about 3 atmospheres pressure into the separator.

The gases consist in a considerable part of carbon dioxide produced as a result of the roasting operation. As it has been found that such carbon dioxide is very undesirable in the finished extract, the carbon dioxide is removed from the gases by freezing. Thus the gases may be drastically cooled under about 3 atmospheres pressure by means of the evaporation of liquid air in a suitable heat exchange apparatus, the exact construction of which is a matter of choice, but may merely consist of a jacket around the gas container. This very low temperature occasioned by the evaporation of the liquid air will cool these gases to such a point that the therein contained carbon dioxide will be frozen out of the gases and will become deposited in the apparatus and on the walls thereof in the form of carbon dioxide snow. When this is done the residual gases are released from the container and then may be sent to a suitable storage tank, as indicated at the extreme upper right hand corner of the drawing. These gases are kept in storage until they are needed for the next step in the process.

The degasified and dearomatized ground coffee may then either be directly extracted with hot water in quite the usual manner now employed for producing coffee extract, or use may be made of a highly volatile liquid to extract from the ground coffee the therein contained oils and waxy materials. This extract is accomplished by treatment of the ground coffee with a volatile organic liquid. A saturated hydrocarbon of low boiling point has been found to be most suitable for this purpose, and examples of such hydrocarbons are propane, butane, pentane, and, possibly, hexane. These hydrocarbons should be preferably redistilled before use in order to avoid leaving in the coffee any residual low volatile hydrocarbon material which might adversely affect the taste and flavor of the coffee extract. The method of extraction may be one of simple percolation or cyclic extraction on the principle of a Soxhlet extractor. In any event, after the extraction of the waxes and oils, the coffee is spread out in a thin layer, preferably under a vacuum, to insure the removal therefrom of all of the residual organic hydrocarbons.

The thus treated coffee may then be extracted with hot water, the grounds being discharged and the extract directed into a collecting tank. In many cases it has been found desirable to concentrate the extract, as by vacuum evaporation, preferably to such a degree that it attains a concentration of a strength in which one pint, when properly diluted by the user, will yield about 40 average cups of coffee of cup strength. The extract, after thus having been adjusted as to its concentration, has pumped into it, preferably under pressure, enough of the previously stored gases so as to reintroduce into the coffee approximately the same amount of volatile and aromatic constituents as would be present in the coffee if it were merely brewed from the ground coffee by the user as in a percolator or other coffee making device. These volatile materials are fairly soluble in the coffee extract which is thereafter quickly bottled, the bottles hermetically sealed and subjected to pasteurization or sterilization so that the extract will keep indefinitely. Such an extract is of fair keeping qualities, even after being opened and can safely be employed in the household for a period up to ten days after opening, and even longer if the bottle containing the extract after opening is kept under refrigeration.

As indicated on the left side of the drawing by the dotted lines, there may be added to the process as thus far described an additional step which is very advantageous, this being the already previously mentioned precipitation of the coffee extract by means of a water-miscible organic solvent. This, for example, may consist of methyl alcohol, ethyl alcohol, propyl alcohol, acetone or ether. Acetone has been found to be particularly suitable as it has the desirable maximum precipitating power, volatility and non-toxic properties. The ratio of the organic solvent by volume to the coffee extract may be up to about 3 to 1, but the invention is not to be limited to such ratio. The most effective way to carry out this step is to flow the cooled coffee extract through a suitable pipe underneath the surface of a container which already contains the desired amount of the organic solvent. By thus introducing the coffee extract into the solvent the most rapid and maximum precipitation of the undesirable gummy material is effected. A number of tests have been made on the nature of the precipitate obtained, but it defies analysis. What is known about it, however, is the fact that it greedily absorbs oxygen from the air. In other words it is of a very oxidizable nature and probably is that substance in coffee which gives it its stale taste when coffee is allowed to stand around after it has been brewed. This gummy material, if it were allowed to remain in the coffee extract, might stay in the solution so long as the bottles of extract remained closed, but by virtue of their ready oxidation would tend to absorb oxygen from the air after the bottle has been opened, and would then precipitate out giving the coffee a stale flat taste. Of course, under conditions where the coffee extract will be used almost immediately after opening, as for instance on steamships, large hotels and restaurants, it might not be necessary to resort to this precipitation step, but for household consumption, where the open bottle of extract is liable to be kept for a number of days, the precipitation process insures the maintenance in the finished extract of the original fresh coffee flavor.

The gummy material precipitated, for example, by acetone, is rather difficult to filter, and it has been found that the most feasible manner of removing the precipitate from the liquid is by centrifuging, and a centrifuge for that purpose is indicated on the flow sheet. After the removal of the gummy precipitate the residual liquid is directed into a suitable still which may be either operated at atmospheric pressure or under a partial or complete vacuum. In any event the volatile liquid, for example, the acetone, is removed from the coffee extract by distillation. It has been found desirable to carry out the distillation to such an extent that at least some of the water in the extract is also volatilized, thereby assuring substantially complete removal of the volatile solvent. The solvent vapor may be directed through the diagrammatically indicated line coming from the still, pass through a condenser diagrammatical shown and put back into the container for the acetone or other solvent, whichever may have been used. If desired, the still may be then further operated as an evaporator to bring the extract to the desired strength. In any event, no matter which of the two alternative methods is employed, the final extract has reintroduced into it a sufficient amount of the volatile material freed from $CO_2$ to give it the original fresh coffee flavor.

The invention is not to be limited by any particular instrumentalities nor to the use of any particular hydrocarbon solvent for the initial extraction of the ground coffee, nor to any particular water-miscible solvent for the gum precipitation stages. Furthermore, the centrifuge may be replaced by a suitable filtering mechanism. The method of removal of the $CO_2$ may also be modified and cooling may be effected so as merely to liquefy the $CO_2$, and for that purpose ammonia refrigeration or carbon dioxide refrigeration may be resorted to. It has been found, however, undesirable to contact these gases with water in an attempt to wash out the $CO_2$ as the volatile materials are soluble in water and therefore the freezing technique is to be preferred. The use, however, of a suitable dry adsorbent which will assert a selective action upon the $CO_2$ without adversely affecting the desired volatile aromatic principles may be substituted for the freezing step.

In the hereto appended claims the invention is claimed in its entirety as well as in various subcombinations, all of which are to be construed in accordance with the present specification. Accordingly the inventor claims as new:

1. The process of producing an aqueous coffee extract which comprises removing gases and volatile matter from roasted coffee, extracting the residual coffee with water to produce a liquid extract, separating carbon dioxide from the said gases, and recombining the remaining gases and volatile matter with the extract.

2. The process of claim 1, on which the separation of the carbon dioxide is effected by low temperature refrigeration.

3. The process of claim 1, in which the liquid extract is concentrated prior to the recombination therewith of the gases and volatile matter.

4. The process of producing a liquid coffee extract which comprises removing volatile matter, gases and carbon dioxide from roasted coffee and separating the carbon dioxide therefrom; subjecting the degasified coffee to extraction with a low-boiling solvent to remove oils and waxes therefrom, then extracting the coffee with water to produce a liquid coffee extract, and combining therewith the carbon-dioxide-free gases and volatile matter.

5. The process of claim 4, in which the liquid extract is concentrated prior to the reintroduction thereinto of the gases and volatile matter.

6. The process of claim 4, in which the solvent is a saturated hydrocarbon selected from the group consisting of propane, butane, pentane and hexane.

7. The process of producing a liquid coffee extract which comprises removing gases, carbon dioxide and volatile matter from roasted coffee and separating the carbon dioxide therefrom, extracting the roasted coffee with a low-boiling saturated hydrocarbon to remove oils and waxes therefrom, then extracting the coffee with water to produce a liquid extract, mixing said extract with a water-miscible organic solvent having a boiling point below that of water to precipitate from the extract an undesired gummy substance, removing said precipitated substance from the mixture of extract and organic solvent, distilling the said solvent from the extract and recombining the latter with the carbon-dioxide-free gases and volatile matter.

8. The process of claim 7, in which the organic solvent is from the group consisting of methyl alcohol, ethyl alcohol, propyl alcohol, ether and acetone.

9. The process of claim 7 in which the organic solvent is acetone.

10. In the process of producing an aqueous coffee extract, the step of removing an oxidizable undesirable gummy substance therefrom by admixture of said extract with a water-miscible organic solvent to precipitate said substance, separating said precipitated substance, and then distilling the organic solvent from the extract by volatilization of the solvent.

11. Process of producing an aqueous coffee extract according to claim 10, in which the organic solvent is acetone.

ELTON R. DARLING.